June 17, 1941.   L. BLACKMORE   2,245,751
FASTENING DEVICE
Filed Sept. 26, 1938

Inventor
Lloyd Blackmore
By Blackmore, Spencer & Flint
Attorneys

Patented June 17, 1941

2,245,751

UNITED STATES PATENT OFFICE 2,245,751

FASTENING DEVICE

Lloyd Blackmore, Detroit, Mich., assignor to General Motors Corporation, Detroit, Mich., a corporation of Delaware Application September 26, 1938, Serial No. 231,727

2 Claims. (Cl. 151—3)

This invention relates to fastening devices and has particular reference to a device which may be used as a nut lock to prevent the nut from coming unloosened from its bolt, or as a fastening to prevent the withdrawal of a bearing or a pipe end from an opening.

The device of the invention is of general C shape and is adapted to be applied to a grooved head to hold the head in an opening, or to the threaded end of the bolt either before the nut is applied or after the nut is in position.

The essential feature of the fastening device is the provision of arms having inwardly notched or barbed surfaces which are adapted to fit in the grooves of a head or to contact the threads of the bolt when the device is in position. These barbed surfaces are bent or arched away from the plane of the arms of the device so that they are inclined from the inside or center downwardly to the outside of the device. When the nut is tightened on the bolt the arched or inwardly bent margins are pressed against the shoulders of the grooved head or against the threads of the bolt and are also sprung toward a flat position so that there is a constant pressure against the head or against the nut to prevent its release.

On the drawing

Figure 1:
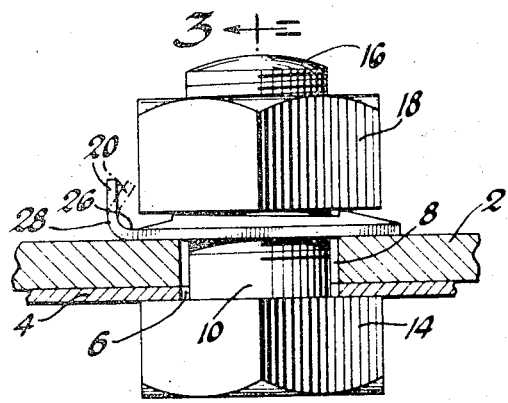
Figure 1 shows the device as it appears in use when used as a nut lock.

Referring to the drawing, the numerals 2 and 4 indicate two adjacent plates which are to be secured together. The plates have the bolt openings 6 and 8 through which the shank 10 of the bolt 14 is adapted to pass. On the threaded end 16 of the bolt the nut 18 is applied and between the bottom of the nut 18 and plate 2 the fastening device or lock washer 20 of the invention is applied.

Figure 2:
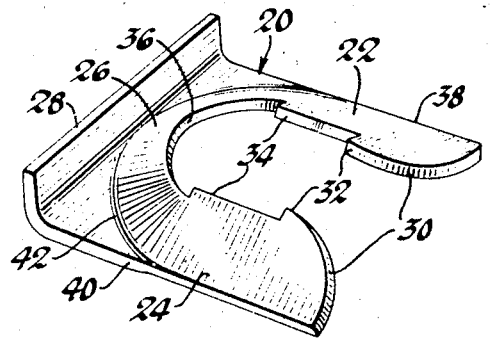
Figure 2 is a perspective view of the fastening device.

The fastening device 20 is shown in perspective view in Figure 2 and comprises a generally C-shaped member having the arms 22 and 24 and the back 26 joining the arms. The back 26 has the bent over portion or flange 28 which is substantially at right angles to the main part of the fastening device. This flange 28 is to enable the fastening device to be seized with the fingers and placed in position or serves as an abutment for a hammer to pound the device in position.

Figure 4:
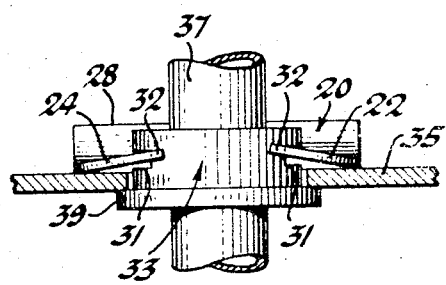
Figure 4 is a front end view of the device applied to a grooved head to hold the head in an opening.

The ends of the arms 22 and 24 are rounded or arched as indicated at 30 to enable an easy application of the device when it is placed in position, such as when it is to be applied to the grooves 31 of the head 33 in Figure 4, or after the nut 18 has been applied to the threaded end 16 of the bolt. These rounded or arcuate ends 30 terminate in the sharp barbs 32 and the distance between the barbs 32 is slightly smaller than the width of the threaded part 16 of the bolt 14, or of the distance between the grooves 31 so that when the device 20 is applied when the head 33 is in position, or after the nut 18 has been screwed in place, the device must be driven home and will be held in place because the distance between the barbs 32 will prevent the device from leaving the shank of the bolt or the grooves unless force is applied. There is sufficient spring in the arms 22 and 24 to allow a slight spread to enable the barbs 32 to pass over the bolt 16 or grooves 31.

Figure 3:
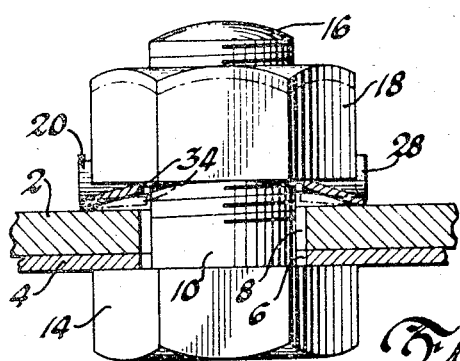
Figure 3 is an enlarged sectional detailed view on line 3—3 of Figure 1.

The inner edge faces or surfaces 34 of the mouth of the C are stepped or notched as shown in Figure 2 and the rear edge face 36 adjacent the back 26 is rounded as shown. After the fastening device 20 has been formed, a tool is applied to give the arms and back a sloping formation. That is, the outer edges 38 and 40 of the arms 22 and 24, respectively, are left in substantially their original plane while the inner margins of the arms at 34 are bent away from the plane as is best seen in Figures 1, 2, and 3. The inner margins at 34 are bent in the same direction as the rear flange 28 and the back 26 and the rear edge 36 are formed as a part of the cone indicated by the arc 42.

Referring to Figure 3, the device 20 is shown used as a lock washer and as being in position before the nut 18 is tightened. After the nut 18 is tightened the inner margin of the lock washer at 34 will take the dotted line position and the lower edges of the side faces 34 will tightly grip the threads 16 of the bolt. With the inner margin at 34 of the fastening device 20 sprung from the full line to the dotted line position of Figure 3, the inner margins of the arms 22 and 24 will push outwardly and tend to regain their original form and this outward movement of the arms will produce a pressure against the underside of the nut 18 firmly to hold it in place. After the the nut has been tightened, the flange 28 may be hammered against the nut 18, as shown in Figure 1.

Figure 4 shows the application of the fastening device to a head 33 to hold the head in a plate, web or board 35. The head 33 may be the end of a hose or pipe 37 or may serve as a bearing for a shaft. The head is provided with a flange 39, which abuts against one side of the plate 35, and with two grooves 31 which are on the side of the plate 35 opposite to the flange 39 when the head 33 is in position. With the head in place, the arms 22—24 of the fastening device 20 are forced into the grooves 31 to retain the head in place. The barbs 32 of the fastener will first contact the bottoms of the grooves and spread or spring the arms apart. When the barbs 32 have passed out of the grooves, the arms 22 and 24 will spring back to their original position. The inner edges of the arms will also be compressed or placed under tension, i. e., they will be passed or forced toward the plate 35, Figure 4, because the extent of deviation of the inner margins at 34 from the plane of the outer edges 38 and 40 of the arms, is greater than the distance from the outer shoulder of the groove to the plate 35.

Figure 5:
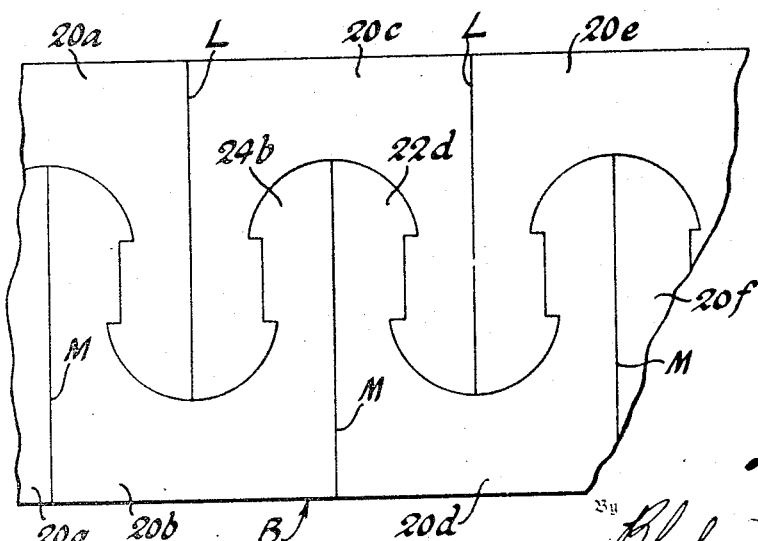
Figure 5 is a plan view of the blank from which the fastening devices are formed.

Figure 5 shows the blank B from which the fastening devices or lock washers are formed. The shapes of the adjacent devices or lock washers are indicated by the numerals 20a—20g inclusive. From Figure 5 it will be seen that the arms 24b and 22d, for instance, are formed from the hollow part or mouth of the C of the fastening device 20c so that from the mouth or opening in the C of each fastening device the arms of adjacent fastening devices are formed, being divided on the lines L and M.

It will be understood that any suitable blanking and forming dies may be used to cut and bend the blanks to their final shape and such mechanism does not form a part of this invention, the blank in Figure 5 with the interlaid pieces being shown to illustrate how the fastening device is not only well adapted for its purposes but may be made from sheet metal without waste.

I claim:

1. A fastening device of resilient sheet metal generally C-shaped in plan having the arms approximately parallel and with the outer parallel edges of the arms and the base of the connecting body portion lying substantially in a plane and with the inner parallel edges of the arms raised above said plane whereby to afford resilient resistance to forces tending to flatten the device, the said inner edges provided adjacent their outer ends with inwardly extending projections spaced apart a slightly less distance than the distance between the arms nearer the body.

2. A fastening device of resilient sheet metal generally C-shaped in plan having the arms approximately parallel and with the outer parallel edges of the arms and the base of the connecting body portion lying substantially in a plane and with the inner parallel edges of the arms raised above said plane whereby to afford resilient resistance to forces tending to flatten the device, the said inner edges provided adjacent their outer ends with inwardly extending projections spaced apart a slightly less distance than the distance between the arms nearer the body, an upturned flange being formed on the rear of said body portion in position to enable said device to be driven into engagement with a member to be held.

LLOYD BLACKMORE.